United States Patent
Bean et al.

(10) Patent No.: US 11,347,841 B1
(45) Date of Patent: May 31, 2022

(54) SYSTEM AND METHOD FOR RUNTIME MONITORING DURING HASH-LOCKED REMOTE ATTESTATION

(71) Applicant: Rockwell Collins, Inc., Cedar Rapids, IA (US)

(72) Inventors: Reginald D. Bean, Center Point, IA (US); Luke E. Ryon, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 72 days.

(21) Appl. No.: 17/018,866

(22) Filed: Sep. 11, 2020

(51) Int. Cl.
*G06F 21/00* (2013.01)
*G06F 21/54* (2013.01)
*G06F 9/38* (2018.01)

(52) U.S. Cl.
CPC ............ *G06F 21/54* (2013.01); *G06F 9/3838* (2013.01); *G06F 2221/034* (2013.01)

(58) Field of Classification Search
None
See application file for complete search history.

(56) References Cited

U.S. PATENT DOCUMENTS

| | | |
|---|---|---|
| 6,615,350 B1 | 9/2003 | Schell et al. |
| 8,037,295 B2 | 10/2011 | Lin |
| 8,544,092 B2 | 9/2013 | Hermann et al. |
| 8,909,930 B2 | 12/2014 | Winslow et al. |

(Continued)

FOREIGN PATENT DOCUMENTS

| | | |
|---|---|---|
| EP | 2230794 A3 | 10/2011 |
| EP | 3195296 B1 | 11/2019 |
| WO | 2010105994 A2 | 9/2010 |

OTHER PUBLICATIONS

Zhao, Huawei et al. Hashed Random Key Pre-distribution Scheme for Large Heterogeneous Sensor Networks. 2012 IEEE 11th International Conference on Trust, Security and Privacy in Computing and Communications. https://ieeexplore.ieee.org/stamp/stamp.jsp?tp=&arnumber=6296039 (Year: 2012).*

(Continued)

*Primary Examiner* — Jeremiah L Avery
(74) *Attorney, Agent, or Firm* — Suiter Swantz pc llo (57) ABSTRACT

A runtime monitoring system for a trusted computing environment is disclosed. In embodiments, the environment includes a trusted processor driven by a primary oscillator and a remote processing component driven by an auxiliary oscillator. A trusted reference hashing module hashes operating codes sent by the trusted processor for execution by the remote processing component; the received operating codes are also hashed by a trusted remote hashing module monitoring the remote processing component. A correlation module matches the remote and reference hashes and advances or delays the auxiliary oscillator to loop-lock the remote processing component to the trusted processor. The trusted processor periodically seeds the operating codes with a unique challenge having a unique hash response. The hash response received from the remote hashing module is checked against the reference hash response generated by the reference hashing module to verify that the remote processing component remains trusted and uncompromised.

13 Claims, 4 Drawing Sheets

(56) References Cited

U.S. PATENT DOCUMENTS

| | | | |
|---|---|---|---|
| 9,158,604 B1* | 10/2015 | Christodorescu | G06F 21/00 |
| 10,523,688 B1 | 12/2019 | Ryon et al. | |
| 10,735,205 B1* | 8/2020 | Wentz | H04L 9/3257 |
| 2009/0177882 A1 | 7/2009 | Saran et al. | |
| 2014/0351951 A1 | 11/2014 | Ronchi et al. | |
| 2015/0215762 A1 | 7/2015 | Edge | |
| 2015/0280922 A1 | 10/2015 | Sibert | |
| 2016/0092700 A1 | 3/2016 | Smith et al. | |
| 2016/0217029 A1* | 7/2016 | Yoon | G06F 9/54 |
| 2017/0310688 A1 | 10/2017 | Lecomte et al. | |
| 2018/0212966 A1 | 7/2018 | Costa | |
| 2020/0067927 A1* | 2/2020 | Ellingson | H04L 63/0428 |
| 2021/0124711 A1* | 4/2021 | Ansari | G06F 11/0736 |

OTHER PUBLICATIONS

Pustisek, Matevz et al. Secure Modular Smart Contract Platform for Multi-Tenant 5G Applications. IEEE Access, vol. 8. https://ieeexplore.ieee.org/stamp/stamp.jsp?tp=&arnumber=9163092 (Year: 2020).*

* cited by examiner

SYSTEM AND METHOD FOR RUNTIME MONITORING DURING HASH-LOCKED REMOTE ATTESTATION

CROSS-REFERENCE TO RELATED APPLICATIONS

This application relates to the following application filed on Apr. 12, 2017 and incorporated herein by reference in its entirety: U.S. patent application Ser. No. 15/485,964, and entitled COMPUTING SYSTEM ATTESTATION which issued Dec. 31, 2019 as U.S. Pat. No. 10,523,688.

BACKGROUND

Leveraging commercial off the shelf (COTS) components may lead to the incorporation into trusted devices or systems of third-party devices or modules that may not be associated with a high level of trust. In particular, suspect third-party systems, whether hardware-based or software-based, may incorporate trojans, viruses, or other types of malware that may lead to malicious operations or unintended behaviors, such as the exfiltration of highly sensitive data, on the part of the otherwise trusted device or system. For example, a COTS desktop computing platform equipped with network-accessible interfaces (e.g., an interconnected military system) may inadvertently incorporate a hardware or software Trojan that inserts processor instructions to create a back door into the system, allowing remote observation of processing functions and/or system data. Through such a hidden back door, an untrusted third party may extract and/or exfiltrate sensitive information, or otherwise compromise the trusted device or system, allowing the third party to compromise the system through the back door or even gain command and control.

SUMMARY

A runtime monitoring system for a trusted processing environment is disclosed. In embodiments, the runtime monitoring system includes trusted processors driven by a primary oscillator and configured to generate operating codes ("op codes") and sequences thereof. A trusted reference hashing module running on the trusted processors generates main output hashes based on the op codes. The trusted processing environment includes a remote processing component driven by an auxiliary oscillator and in communication with the trusted processors (from which it receives op codes for execution). The auxiliary oscillator is linked to the primary oscillator and may advance or delay the remote processing component based on instructions received therefrom. A remote hashing module monitoring the remote processing component generates auxiliary output hashes based on the received op codes. The trusted processors periodically "seed" the op codes with unique input vectors or attestation challenges, each challenge having a unique attestation response incorporated into the auxiliary output hashes and sent back to the trusted processors. The reference hashing module similarly receives the seeded op codes and generates unique attestation responses thereto that should match those in the auxiliary output hashes. The trusted processing environment includes a correlation module for correlating the main output hashes and auxiliary output hashes; advance or delay commands to the auxiliary oscillator are sent if the hashes do not align and corrective action may be taken if there is a failed correlation. The trusted processors identify, within the auxiliary output hashes received from the remote processing component, the unique responses to its seeded challenges, comparing these unique responses to the reference responses generated by the reference hashing module within the main output hashes. If the unique responses are not identical, the trusted processors designate the remote processing component as untrusted and/or take other corrective action.

In some embodiments, the remote processing component is a remote device or a peripheral hardware component of the trusted processor.

In some embodiments, the reference hashing module is configured to run on a standalone processor.

In some embodiments, the trusted processor identifies, based on the comparison of the unique attestation responses, unintended behavior on the part of the remote processing module.

In some embodiments, the correlation module includes arrays of main hash registers, auxiliary hash registers, and comparison registers. The main hash registers sequentially receive the main output hashes from the reference hashing module, while the auxiliary hash registers sequentially receive the auxiliary hash registers from the remote hashing module. The comparison registers, situated between the main hash registers and the auxiliary hash registers, compare each auxiliary output hash to its corresponding main output hash, advancing or delaying the remote processing component if the corresponding main and auxiliary output hashes are not found in aligned main and auxiliary hash registers (e.g., if the main and auxiliary output hashes are positively or negatively misaligned).

In some embodiments, the correlation module takes one or more corrective actions based on a failed correlation of the main output hash and auxiliary output hash.

In some embodiments, the correlation module automatically executes periodic advance or delay commands to the auxiliary oscillator, e.g., within a predetermined number of clock cycles.

In some embodiments, the trusted processing environment is a highly synchronized environment where each rendezvous point corresponds to a single op code.

In some embodiments, the primary oscillator drives the trusted processors at a faster-than-runtime rate between rendezvous points, holding the trusted processors at each rendezvous point until the remote processing component reaches the rendezvous point.

A method for runtime monitoring of a hash-locked remote processing component is also disclosed. In embodiments, the method includes generating, via a trusted processor driven by a primary oscillator, operating codes (op codes) for execution by the remote processing component (driven by an auxiliary oscillator connected to the primary oscillator). The method includes generating, via a reference hashing module connected to the trusted processors, main output hashes corresponding to the op codes. The method includes generating, via a remote hashing module monitoring the remote processing component, auxiliary output hashes based on the op codes. The method includes correlating each auxiliary output hash to its corresponding main output hash, and advancing or delaying the remote processing component via the auxiliary oscillator if the main and auxiliary output hashes are positively or negatively aligned. The method includes generating, via the trusted processors, unique attestation challenges, each attestation challenge having a unique attestation response determinable by the reference hashing module. The method includes modifying or seeding, via the trusted processors, the op codes based on the unique attestation challenges. The method includes receiving from the remote hashing module the auxiliary output hashes based on the received seeded op codes. The method includes identifying, via the trusted processors, the unique attestation challenges within the received auxiliary output hashes. The method includes comparing, via the trusted processors, the received attestation responses with reference attestation responses generated by the reference hashing module based on the seeded op codes. The method includes designating the remote processing component as either trusted or untrusted based on the comparison.

In some embodiments, the method includes identifying unintended behaviors on the part of the remote processing component based on the comparison.

In some embodiments, the method includes: sequentially receiving the main output hashes and auxiliary output hashes within parallel arrays of main hash registers and auxiliary hash registers; comparing each auxiliary output hash to its corresponding main output hash; sending an aligned command to the auxiliary oscillator if the main and auxiliary output hashes align; sending an advance command to the auxiliary oscillator if the main and auxiliary output hashes are negatively misaligned; and sending a delay command to the auxiliary oscillator if the main and auxiliary output hashes are positively misaligned.

In some embodiments, the method includes executing corrective actions based on a failed correlation of the auxiliary and main output hashes.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for runtime monitoring of a hash-locked remote untrusted system or untrusted component of an otherwise trusted system. For example, while the prior disclosure Ser. No. 15/485,964, which is herein incorporated by reference in its entirety, provides for one-time confirmation that a trusted environment is malware-free via an attestation function, the instant disclosure provides continuous real-time assurance of trusted status via the implementation of hash-locked processor monitoring.

Figure 1:
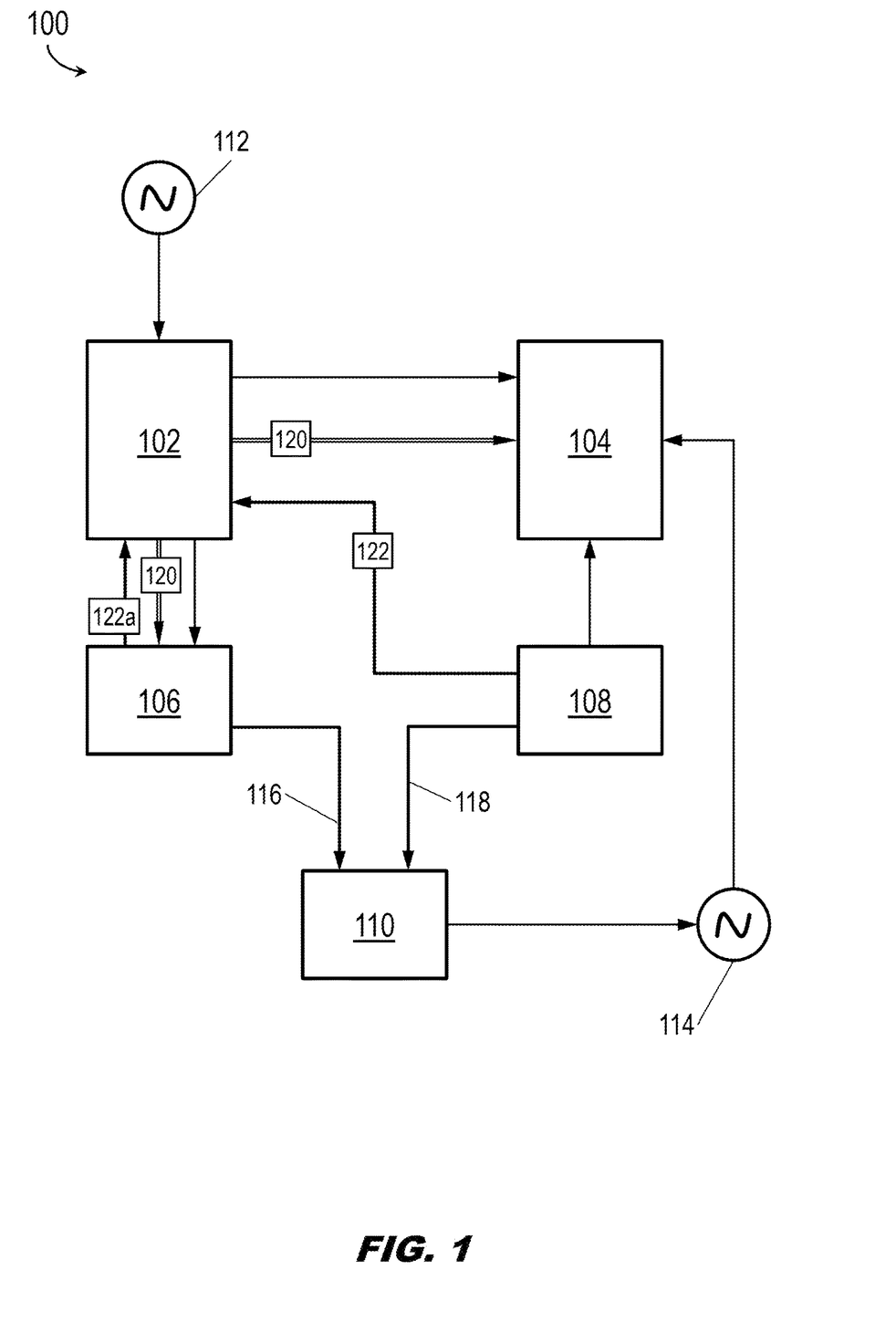
FIG. 1 is a block diagram illustrating a runtime monitoring system incorporating hash-locked remote attestation according to example embodiments of this disclosure.

Referring to FIG. 1, a trusted processing environment 100 is disclosed. The trusted processing environment may include a trusted processing device 102, remote processing component 104, reference hashing module 106, remote hashing module 108, and correlation module 110.

In embodiments, the remote processing component 104 may include commercial off the shelf (COTS) circuit boards, peripheral hardware (e.g., a peripheral hardware component physically attached or connected to the trusted processing device 102, or a fully remote device), and/or software modules (e.g., executing on a remote processor) having a communicative link to the trusted processors of the trusted processing device 102. As the remote processing component 104 may not have an equivalent trust level to the trusted processing device 102; the remote processing component may be vulnerable to compromise by viruses, trojans, malicious code, or other forms of malware.

In embodiments, the correlation module 110 may enable continuous runtime monitoring of the remote processing component 104 by keeping the remote processing component aligned with the trusted processing device 102 in a hash-locked loop. For example, the correlation module 110 may be configured to execute on the trusted processing device 102 (but isolated from, e.g., as a separate thread within a time-variant unified processing (tuMP) or other like multitasking environment). Alternatively, the correlation module 110 may be embodied in its own hardware and/or decision logic, with the ability to take corrective action within the trusted processing environment 100 (e.g., or one or more individual components thereof) in the event of a failed comparison as described below. Corrective actions may include, but are not limited to: logging a system error, repeating the attestation function with a new seeded challenge 120, resetting the trusted processing environment 100 or one or more individual components thereof, or complete system shutdown.

In embodiments, the trusted processing device 102 may be driven by a primary oscillator 112. In some embodiments, the primary oscillator 112 may be a fixed oscillator set to a predetermined frequency; in some embodiments the primary oscillator may be configured to drive the trusted processing device 102 at faster than runtime speeds as described below.

In embodiments, the remote processing component 104 may receive command and control (C2) instructions in the form of operating codes ("op codes") executed by the trusted processing device 102. Op codes may include, but are not limited to, first-stage or second-stage boot instructions, commanded tests, or any other appropriate interrupt-driven single-threaded instruction sets or non-interruptible instruction sets. The remote processing component 104 may be driven by an auxiliary oscillator 114 (e.g., variable oscillator) of adjustable frequency controllable by the correlation module 110 as described below.

In embodiments, the reference hashing module 106 may be a component of the trusted processing device 102 (e.g., a software module executing on the trusted processors) or may itself be a trusted device incorporating processors of equivalent trust level. For example, as the op codes are executed by the trusted processors 102, each op code is sent to the reference hashing module 106 for hashing. Similarly, in embodiments the remote hashing module 108 may be a trusted processing device separate and distinct from the remote processing component 104. For example, the remote hashing module 108 may monitor all forms of access to the remote processing component 104, including (but not limited to) address buses, data lines, programmable and combinatorial logic components, state machines, and other information sources.

In embodiments, the correlation module 110 may receive main output hashes 116 and auxiliary output hashes 118 from respectively the reference hashing module 106 and remote hashing module 108, each main output hash and auxiliary output hash based on the same op code or set of op codes. For example, by correlating each auxiliary output hash 118 generated by and received from the remote hashing module 108 to its counterpart main output hash 116 generated by and received from the reference hashing module 106, the correlation module 110 may ensure that the remote processing component 104 remains in alignment with the trusted processing device 102 and that all op codes generated by the trusted processing device are accountable. If the remote processing component 104 is found to be misaligned with the trusted processing device 102, the correlation module 110 may transmit advance or delay commands to the auxiliary oscillator 114 to restore the alignment and keep the remote processing component locked to the trusted processing device. In some embodiments, the correlation module 110 may declare a system fault and shut down the trusted processing environment 100, e.g., if an auxiliary output hash 118 has no correlating main output hash 116 (as described in greater detail below by FIG. 2).

In embodiments, as the remote processing component 104 is hash-loop locked to the trusted processing device 102 as described above, the trusted processing device may periodically challenge the remote processing component to ensure that the remote processing component is not compromised. For example, as the trusted processing device 102 issues op codes to the remote processing component 104 (and as these op codes are hashed by the remote hashing module 108), the trusted processing device may trigger a remote attestation operation in the remote processing component.

In embodiments, remote attestation operations may use secure one-way cryptographic hash functions to determine an attestation result, using all available memory of the remote processing component 104. In this way the remote processing component 104 may be prevented from recalculating and replaying a prior attestation result. Similarly, as the memory of the remote processing component 104 (which may be known to the trusted processing device) may be filled by a secure known pattern, the remote processing component may be prevented from hiding malicious code from the attestation function. For example, the secure known pattern may include, but is not limited to, a predefined random or pseudorandom data stream, or an unpredictable runtime data stream.

In embodiments, the trusted processing device 102 may trigger a remote attestation operation by generating a challenge, or nonce (120; e.g., a unique code, string, function, and/or input vector securely generated and used exactly once), and "seeding" an op code or set of op codes according to the challenge. For example, the challenge 120 may have a unique response 122 corresponding to an auxiliary output hash 118 determinable by the remote hashing module 108 up to a predetermined rendezvous point. At the same time, the trusted processing device 102 may provide the challenge 120 to the reference hashing module 106, which calculates the unique response (122a), which should likewise correspond to a main output hash 116 of the challenge up to the same rendezvous point.

In embodiments, the trusted processing device 102 and remote processing component 104 may be generally synchronized or highly synchronized. For example, the trusted processing device 102 and remote processing device 104 may be generally synchronized at a low level of granularity in that each rendezvous point wherein the auxiliary output hash 118 (e.g., and the unique response 122 to the challenge 120 incorporated thereinto by the remote hashing module 108) is compared to the main output hash 116 (e.g., and the unique response 122a calculated by the reference hashing module 106) may correspond to a group or sequence of op codes. In some embodiments, the trusted processing device 102 and remote processing device 104 may be highly synchronized (e.g., to a high degree of granularity) in that each rendezvous point corresponds to a single op code seeded with the challenge 120. For example, a main output hash 116 (e.g., incorporating a unique response 122a) and an auxiliary output hash 118 (e.g., incorporating a unique response to the challenge 120) may be generated, and compared, for each individual op code generated by the trusted processing device 102 and received by the remote processing component 104.

In some embodiments, the trusted processing device 102 may be configured for faster than runtime operations. For example, the trusted processing device 102 may be driven by the primary oscillator at a high rate (e.g., faster than normal runtime) between rendezvous points, reaching a rendezvous point before the remote processing component 104 and holding (e.g., pausing) there until interrupted (e.g., by the arrival of the remote processing component 104 at the rendezvous point) to resume challenging the remote processing component as described above.

In some embodiments, the trusted processing environment 100 may be a multithreaded environment wherein each of multiple processing threads correlate to a rendezvous point in the processing sequence of the remote processing component 104. For example, the remote hashing module 108 may precompute a sequence of auxiliary output hashes 118, each auxiliary output hash loaded into a tap (FIG. 2: 204a-n) of the correlation module 110. The correlation module 110 may then proceed through the sequence of preloaded auxiliary output hashes 118, sequentially responding to the trusted processing device 102 and triggering each in a sequence of corresponding main output hashes 116, each main output hash corresponding to a rendezvous point and including a unique response 122a to be compared to the unique response 122 within the compared to the corresponding auxiliary output hash.

In embodiments, the remote hashing module 108 sends the unique response 122 to the trusted processing device 102 for verification. As the remote processing component 104 is kept hash-loop locked to the trusted processing device 102, the unique response 122 to the challenge 120 corresponding to a predetermined rendezvous point calculated by the remote hashing module 108 should be identical to the unique response 122a calculated by the reference hashing module 106 (and corresponding to the trusted processing device 102). If the trusted processing device 102 determines that the unique response 122 calculated by the remote hashing module 108 is not equivalent to the unique response 122a calculated by the reference hashing module 106, the trusted processing device may designate the remote processing component 104 as compromised or untrusted and take corrective action as described above.

In some embodiments, the trusted processing device 102 may detect or identify, based on the comparison of the unique responses 122, 122a, unintended behavior on the part of the remote processing component 104. For example, the processing sequence of the remote processing component 104 may include one or more triggering sequences of expected/intended operations or behaviors (e.g., specific reactions to specific op codes or sequences thereof) known to the trusted processing device 102. Accordingly, the challenge 120 (and therefore the auxiliary output hash 118) may be based on these triggering sequences, and the unique response 122 based on, or equivalent to, the corresponding intended behaviors. Similarly, the reference hashing module 106 may incorporate the triggering sequences into the generation of the main output hash 116, and the unique response 122a may be a replica of the intended behaviors. Accordingly, the comparison of the unique responses 122, 122a may detect unintended behaviors as reflected by the unique response 122, leading to possible corrective action.

In some embodiments, the remote processing component 104 may incorporate multiple components or units (e.g., redundant components) attested together via a single unique challenge 120. In some embodiments, the remote processing component 104 may include a file system. For example, the slack space and free space within the file system may be filled with a secure known pattern as described above according to a particular deterministic order (e.g., a file system ordering) to ensure a known and repeatable attestation. In some embodiments, the challenge 120 and corresponding unique response 122 may be precalculated and securely cached; the cached pairs of challenges and response may be frequently updated to guard against replay attacks. In some embodiments, the attestation operation may uniquely identify the remote processing component (e.g., as owned by a particular individual, as installed in a particular location) according to component-specific parameters included in the unique challenge 120. For example, component-specific parameters may include, but are not limited to, low-level device information (e.g., serial or part numbers); bad memory block locations; and/or physically unclonable functions (PUF).

Figure 2:
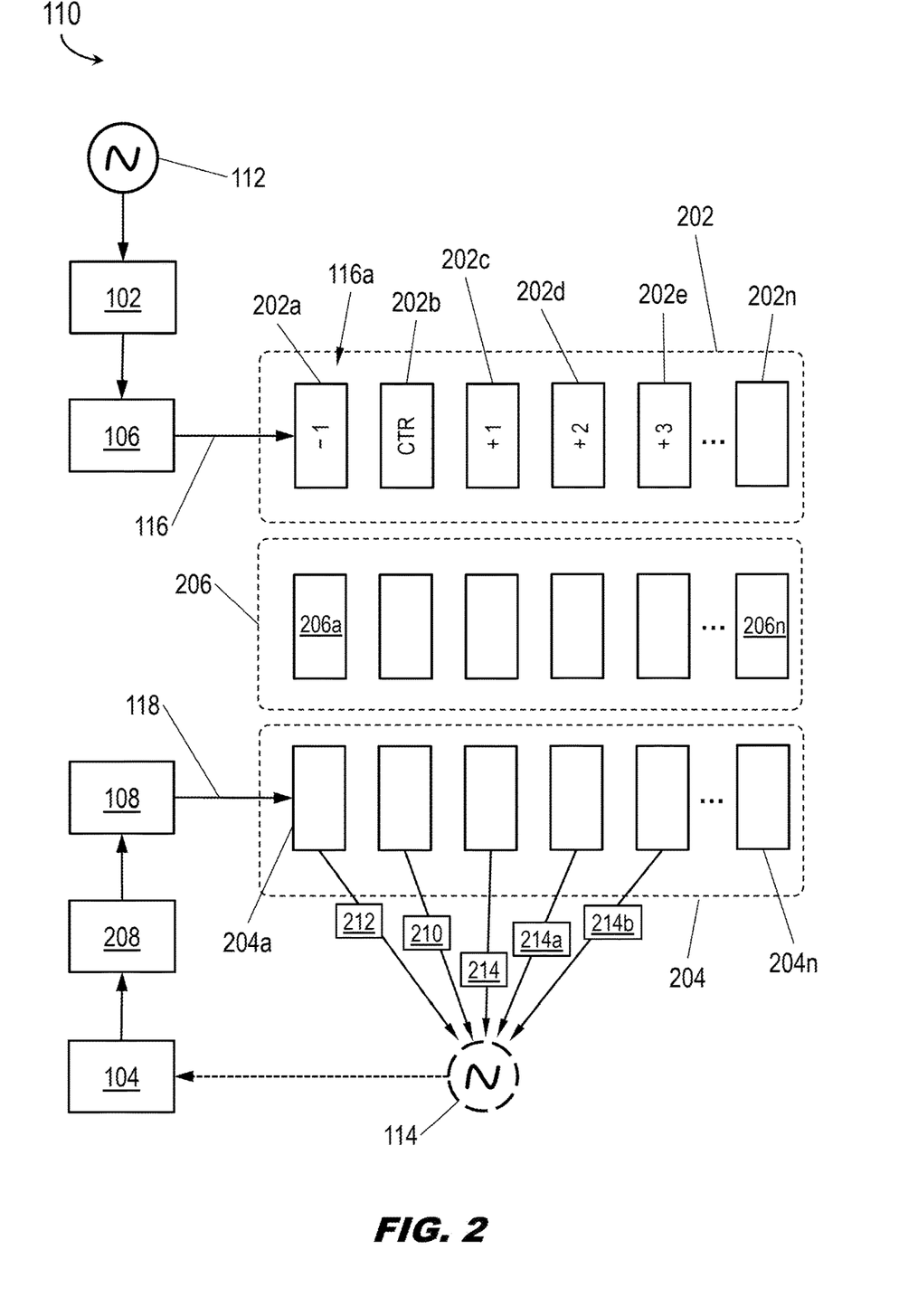
FIG. 2 is a block diagram illustrating a correlation module of the runtime monitoring system of FIG. 1.

Referring now to FIG. 2, the correlation module 110 is shown. The correlation module 110 may include a main hash register 202 (including main taps/tap positions 202a, . . . 202n), auxiliary hash register 204 (including auxiliary taps 204a, . . . 204n), and comparison register 206 (including comparison taps 206a, . . . 206n).

In embodiments, each main output hash 116 may be loaded into the main hash register as it is generated by the reference hashing module 106; in particular, the most recently generated main output hash (116a) may be loaded into a −1 tap position (202a) within the main hash register 202. At the subsequent clock cycle, as the subsequent main output hash 116 is generated, the main output hash 116a in the −1 tap position may be shifted to the next adjacent center tap position (202b) and the subsequent main output hash likewise moved into the −1 tap position. As subsequent main output hashes 116 are generated and loaded into the correlation module 110, the main output hash 116a may continue to be shifted into the next adjacent tap position (+1, +2, +3, . . . ) before dropping off the opposite side of the main hash register 202.

In embodiments, each auxiliary output hash 118 generated by the remote hashing module 108 is delayed (208) by a single clock cycle and then loaded into the auxiliary hash register 204. For example, the auxiliary output hash 118 may be compared to all main output hashes 116, 116a currently within the main hash register 202, and the corresponding comparison register (in auxiliary tap 204a) holding the corresponding main output hash checked. As the auxiliary output hash 118 is delayed (208) by a single clock cycle, the corresponding main output hash 116a should be in the center tap position 202b (e.g., in which case the correlation module 110 may send an aligned command 210 to the auxiliary oscillator, indicating proper alignment of the remote processing component 104 to the trusted processing device 102. In embodiments, if the main output hash 116a corresponding to the current auxiliary output hash 118 is found in any tap position of the main hash register other than main tap 202a, an advance or delay command may be issued to the auxiliary oscillator 114 to realign the remote processing component 104 to the trusted processing device 102. For example, if the corresponding main output hash 116a is found in the −1 tap position (main tap 202a), an advance command (212) is sent to the auxiliary oscillator; if the corresponding main output hash is found in the +1 tap position (main tap 202c), a delay-1 command 214 (e.g., delay for one clock cycle) is sent to the auxiliary oscillator (e.g., delay-2 and delay-3 commands (214a-b) may be possible if the corresponding main output hash is found in the +2 or +3 tap positions (main taps 202d-e). In embodiments, for any main output hash 116, 116a in the main hash register 202, the probability may be zero or near zero that a matching auxiliary output hash 118 may be found in the same column of the auxiliary hash register 204 (e.g., resulting in an errant advance or delay command 212, 214, 214a-b) or an errant check in the corresponding slot of the comparison register 206.

In embodiments, the correlation module 110 may provide additional fault detection based on anomalous comparison results. For example, if a corresponding main output hash 116 is found in a slot of the comparison register (204) that has already been checked, a fault may be declared and the trusted processing environment (100, FIG. 1) may be shut down. Similarly, if a given auxiliary output hash 118 does not correlate to any main output hash 116, 116a within the main hash register 202, the trusted processing environment 100 may be shut down. If a main output hash 116, 116a drops out the opposite end of the main hash register 202, the trusted processing environment 100 may be shut down or other corrective action may be taken as described above.

Figure 3A:
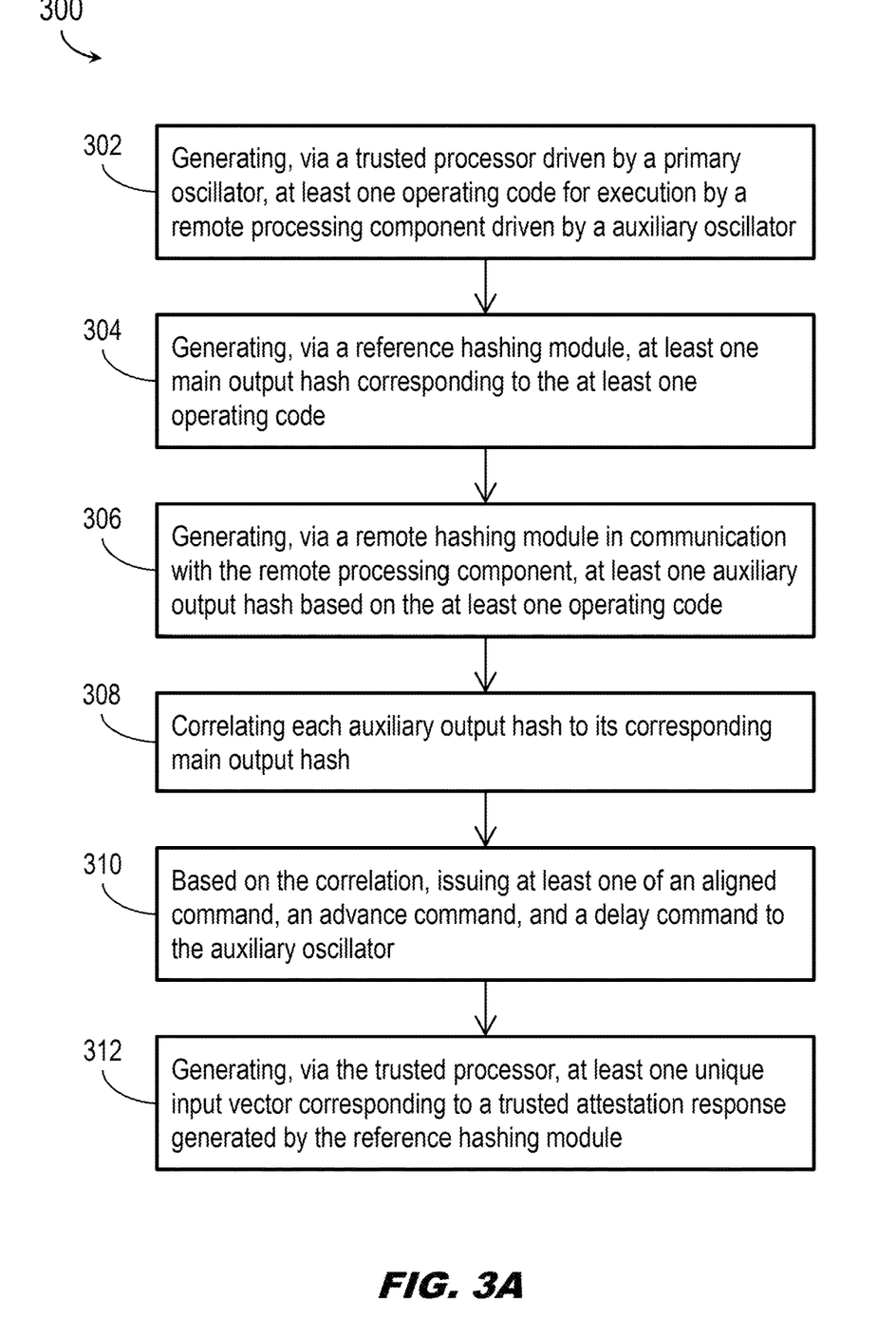
FIGS. 3A and 3B are flow diagrams illustrating a method for runtime monitoring of a hash-locked remote processing component according to example embodiments of this disclosure.
Figure 3B:
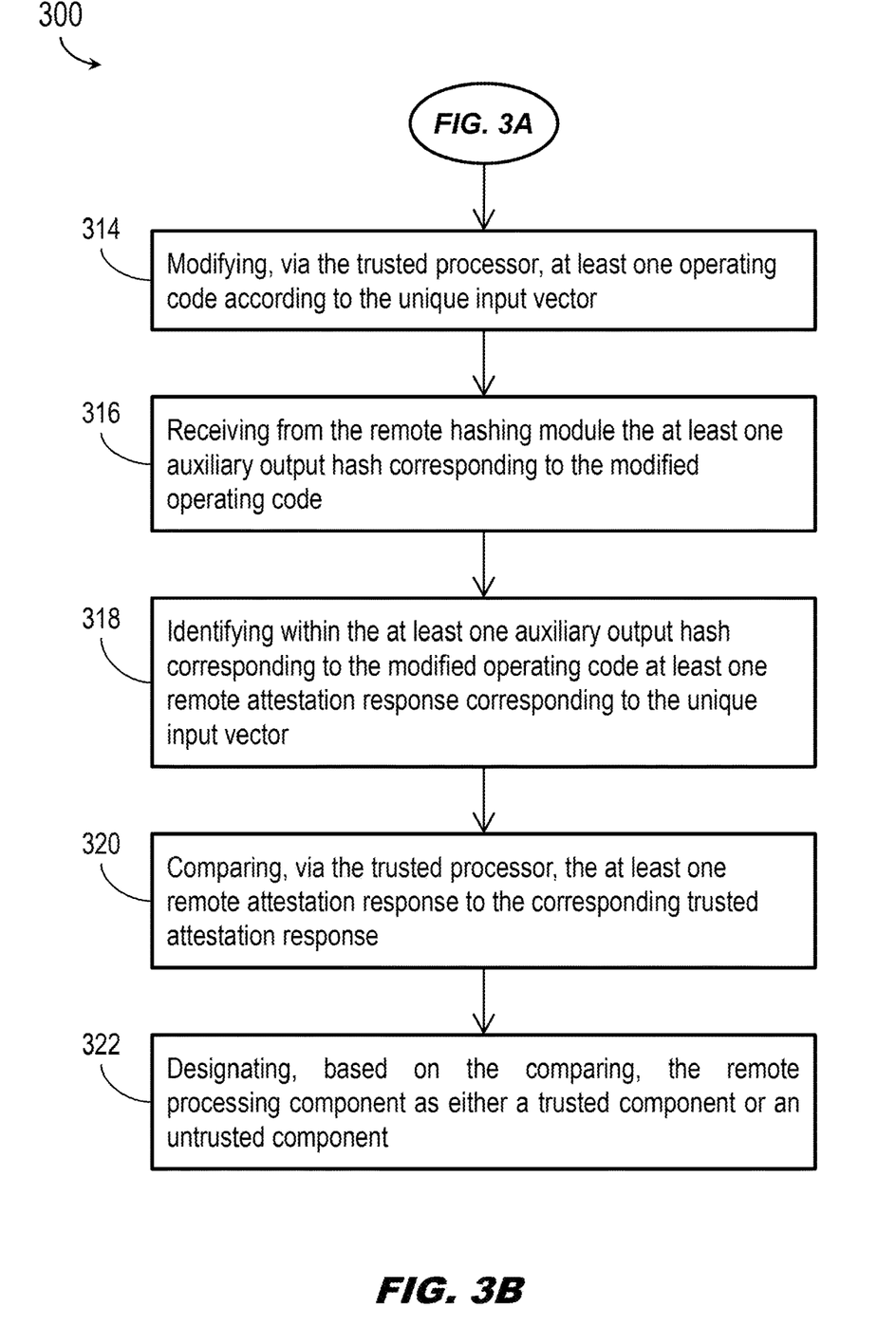

Referring now to FIG. 3, the method 300 may be implemented by the trusted processing environment 100 and may include the following steps.

At a step 302, the trusted processor device, driven by a primary oscillator, generates op codes for execution by a remote processing component driven by an auxiliary oscillator.

At a step 304, a reference hashing module in communication with the trusted processing device generates main output hashes based on the op codes.

At a step 306, a remote hashing module in communication with the remote processing component generates auxiliary output hashes based on the op codes received by the remote processing component from the trusted processing device.

At a step 308, a correlation module receives each auxiliary output hash and each main output hash, correlating each auxiliary output hash to its corresponding main output hash. In some embodiments, the correlation module may sequentially receive the main output hashes in a main hash register and sequentially receive the auxiliary output hashes in an array of auxiliary hash registers aligned with the main hash registers. The correlation module may compare each auxiliary output hash to the main hash registers to find a corresponding main output hash.

At a step 310, the correlation module based on the correlation of the auxiliary and main output hashes, issues an aligned command, an advance command, or a delay command to the auxiliary oscillator driving the remote processing component. For example, an aligned command may indicate a proper alignment of the auxiliary and main output hashes; an advance or delay command may respectively indicate a negative or positive misalignment of the auxiliary and main output hashes. In some embodiments, the correlation module may declare a fault condition and execute corrective actions, which may include (but are not limited to) a shutdown of the trusted processing environment.

At a step 312, the trusted processing device generates a unique challenge (e.g., input vector) corresponding to a unique attestation response.

Referring also to FIG. 3B, at a step 314 the trusted processing device modifies or "seeds" one or more op codes based on the unique challenge.

At a step 316, the trusted processing device receives from remote hashing module the auxiliary output hash or hashes corresponding to the modified op code "seeded" with the unique challenge.

At a step 318, the trusted processing device identifies within the received auxiliary output hash the attestation response corresponding to the unique challenge.

At a step 320, the trusted processing device compares the remote attestation response received from the remote hashing module to the reference attestation response generated by the trusted reference hashing module based on the unique challenge. For example, the trusted processing device may identify unintended behavior on the part of the remote processing component based on the received remote attestation response.

At a step 322, the trusted processing device, based on the comparison of the remote attestation response and the reference attestation response, designates the remote processing component as trusted (e.g., if the remote attestation response matches the reference attestation response) or untrusted (e.g., if the remote attestation response does not match the reference attestation response). The trusted processing device may take additional corrective action if the remote processing component is designated as untrusted, e.g., as described above.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A runtime monitoring system for a trusted computing environment, comprising:
    at least one trusted processor driven by a primary oscillator, the trusted processor configured to generate at least one operating code;
    at least one trusted reference hashing module configured to execute on the trusted processor, the reference hashing module configured to generate at least one main output hash based on the at least one operating code;
    at least one remote processing component communicatively coupled to the trusted processor and driven by an auxiliary oscillator, the remote processing component configured to receive for execution the at least one operating code from the trusted processor;
    at least one trusted remote hashing module in communication with the trusted processor and the remote processing component, the remote hashing module configured to generate at least one auxiliary output hash based on the at least one operating code;

at least one correlation module operatively coupled to the auxiliary oscillator and configured to:
   correlate the main output hash corresponding to each operating code with the auxiliary output hash corresponding to the operating code;
   and
   based on the correlation, transmit at least one of an aligned command, an advance command, and a delay command to the auxiliary oscillator;
the trusted processor configured to, at at least one rendezvous point:
   generate at least one unique input vector corresponding to a unique attestation response generated by the reference hashing module;
   modify the at least one operating code according to the unique input vector;
   identify within the at least one auxiliary output hash corresponding to the modified operating code at least one remote attestation response corresponding to the unique input vector;
   compare the remote attestation response to the unique attestation response;
   and
   based on the comparing, designate the remote processing component as either a trusted component or an untrusted component.

2. The runtime monitoring system of claim 1, wherein the remote processing component includes at least one peripheral hardware component operatively coupled to the trusted processor.

3. The runtime monitoring system of claim 1, wherein the at least one reference hashing module is configured for execution on at least one standalone processor communicatively coupled to the trusted processor.

4. The runtime monitoring system of claim 1, wherein the trusted processor is configured to identify, based on the comparing of the remote attestation response to the unique attestation response, at least one unintended behavior corresponding to the remote processing module.

5. The runtime monitoring system of claim 1, wherein the correlation module comprises:
   an array of main hash registers configured to sequentially receive the at least one main output hash;
   an array of auxiliary hash registers configured to sequentially receive the at least one auxiliary output hash;
   and
   an array of comparison registers including a central comparison register configured to configured to compare each auxiliary output hash to the at least one main output hash;
   the correlating module configured to:
      generate the aligned command based on an alignment of the auxiliary output hash and the corresponding main output hash;
      generate the advance command based on a negative misalignment of the auxiliary output hash and the corresponding main output hash;
      and
      generate the delay command based on a positive misalignment of the auxiliary output hash and the corresponding main output hash.

6. The runtime monitoring system of claim 1, wherein the correlation module is configured to execute at least one corrective action associated with a failed correlation of the auxiliary output hash and the corresponding main output hash.

7. The runtime monitoring system of claim 1, wherein the auxiliary oscillator is configured to execute one or more of an advance command and a delay command within a predetermined number of clock cycles.

8. The runtime monitoring system of claim 1, wherein each rendezvous point corresponds to an operating code.

9. The runtime monitoring system of claim 1, wherein the primary oscillator is configured to:
   drive the at least one trusted processor at an accelerated rate between the at least one rendezvous point and a subsequent rendezvous point;
   and
   hold the at least one trusted processor at the subsequent rendezvous point until the remote processing component reaches the subsequent rendezvous point.

10. A method for runtime monitoring of a hash-locked remote processing component, the method comprising:
   generating, via a trusted processor driven by a primary oscillator, at least one operating code for execution by a remote processing component driven by an auxiliary oscillator;
   generating, via a reference hashing module, at least one main output hash corresponding to the at least one operating code;
   generating, via a remote hashing module in communication with the remote processing component, at least one auxiliary output hash based on the at least one operating code;
   correlating each auxiliary output hash to its corresponding main output hash;
   based on the correlation, issuing at least one of an aligned command, an advance command, and a delay command to the auxiliary oscillator;
   generating, via the trusted processor, at least one unique input vector corresponding to a trusted attestation response generated by the reference hashing module;
   modifying, via the trusted processor, at least one operating code according to the unique input vector;
   receiving from the remote hashing module the at least one auxiliary output hash corresponding to the modified operating code;
   identifying within the at least one auxiliary output hash corresponding to the modified operating code at least one remote attestation response corresponding to the unique input vector;
   comparing, via the trusted processor, the at least one remote attestation response to the corresponding trusted attestation response;
   and
   designating, based on the comparing, the remote processing component as either a trusted component or an untrusted component.

11. The method of claim 10, wherein comparing, via the trusted processor, the at least one remote attestation response to the corresponding trusted attestation response includes:
   identifying at least one unintended behavior corresponding to the remote processing module.

12. The method of claim 10, wherein correlating each auxiliary output hash to its corresponding main output hash includes:
   sequentially receiving the at least one main output hash via an array of main hash registers;
   sequentially receiving the at least one auxiliary output hash via an array of auxiliary hash registers aligned with the array of main hash registers;
   comparing each auxiliary output hash to the at least one main output hash;

generating the aligned command based on an alignment of the auxiliary output hash and the corresponding main output hash;

generating the advance command based on a negative misalignment of the auxiliary output hash and the corresponding main output hash; and generating the delay command based on a positive misalignment of the auxiliary output hash and the corresponding main output hash.

13. The method of claim 10, wherein correlating each auxiliary output hash to its corresponding main output hash includes:

executing at least one corrective action associated with a failed correlation of the auxiliary output hash and the corresponding main output hash.

* * * * *